United States Patent [19]

Otake et al.

[11] 4,004,176
[45] Jan. 18, 1977

[54] STRIPE-SHAPED COLOR SEPARATION FILTER FOR IMAGE PICKUP TUBE AND METHOD FOR MANUFACTURING THE SAME

[75] Inventors: Mitsuru Otake; Saburo Nobutoki, both of Mobara, Japan

[73] Assignee: Hitachi, Ltd., Japan

[22] Filed: Sept. 21, 1973

[21] Appl. No.: 399,745

[30] Foreign Application Priority Data

Oct. 16, 1972   Japan ........................... 47-102672
Oct. 16, 1972   Japan ........................... 47-102673

[52] U.S. Cl. .................. 313/371; 313/388; 427/38; 427/75; 427/162; 427/164; 427/165; 427/166; 427/193; 427/376 A; 427/355; 358/44
[51] Int. Cl.² ..................................... H01J 29/36
[58] Field of Search ............... 117/33.3, 211, 64 R, 117/212, 215; 350/162.5 F; 358/44; 178/7.86; 427/75, 162, 164, 165, 166, 193, 355, 376, 38; 313/371, 388

[56] References Cited

UNITED STATES PATENTS

| | | | |
|---|---|---|---|
| 2,813,989 | 11/1957 | Weimer | 313/371 |
| 2,848,358 | 8/1958 | Gray | 427/75 |
| 3,651,250 | 3/1972 | Dischert | 350/162.5 F X |
| 3,681,519 | 8/1972 | Larsen et al. | 350/162.5 F X |
| 3,735,032 | 5/1973 | Goetze et al. | 358/44 |
| 3,745,236 | 7/1973 | Karato | 350/162.5 F X |
| 3,768,888 | 10/1973 | Nishino et al. | 350/162.5 F |
| 3,787,609 | 1/1974 | Plumeau | 358/44 |

*Primary Examiner*—Ralph S. Kendall
*Assistant Examiner*—John D. Smith
*Attorney, Agent, or Firm*—Craig & Antonelli

[57] ABSTRACT

A stripe-shaped color separation filter for use with an image pickup tube is disclosed which is covered at its one surface with a layer of transparent material such as glass or SiO₂ having a surface thereof which is flat enough to be practical for use with the image pickup tube. The layer of glass or SiO₂ is formed on the filter by directly applying melted materials thereon, melting down (sintering) powdered materials, chemical vapor deposition, sputtering, or vacuum deposition.

31 Claims, 16 Drawing Figures

STRIPE-SHAPED COLOR SEPARATION FILTER FOR IMAGE PICKUP TUBE AND METHOD FOR MANUFACTURING THE SAME

BACKGROUND OF THE INVENTION

The present invention relates to an image pickup tube, and more particularly to a stripeshaped color separation optical filter provided on one side surface of a transparent glass window of the image pickup tube and a method for manufacturing the same.

As is known, an image pickup tube provided with a stripe-shaped color separation filter is, for example, the one for a single tube or dual tube type color television camera. Typically, a television camera device including an image pickup tube such as single tube or dual tube type color image pickup tube is provided with a focusing coil and a deflection yoke around an envelope containing an electron gun. At the end of the envelope there are successively provided a photoconductive film, a transparent conductive film and a stripe-shaped color separation filter. The filter comprises two components one of which includes first narrow stripe-shaped elements substantially permitting all color lights from an object to pass therethrough and second narrow stripeshaped elements substantially preventing red color light of the color lights from the object from passing therethrough, the first and second elements being arranged in alternate relation to each other, and the other of which includes third narrow stripe-shaped elements substantially permitting all the color lights from the object to pass therethrough and fourth narrow stripe-shaped elements substantially preventing blue color light of the color lights from the object from passing therethrough, the third and fourth elements being arranged in alternate relation to each other.

Usually, the fourth elements are formed on the second elements without forming the first and third elements. Consequently, the thus formed filter necessarily has its surface indented at a number of positions. For this reason, the direct formation of the transparent conductive film and the photoconductive film on such an indented surface of the filter causes these films to have their surfaces also indented, resulting in the local variation of dark current upon operation of the image pickup tube. Thus, spurious signals are superimposed on the signals derived from the color lights from the object with the result that hindrances such as the generation of the spurious color signals occur. As mentioned above, the formation of the transparent conductive film and photo-conductive film on the filter having such an indented surface results in reduced yield on manufacturing steps.

SUMMARY OF THE INVENTION

It is, therefore, an object of the present invention to provide a stripe-shaped color separation filter free from the above-mentioned drawbacks and a method for manufacturing the same.

According to one aspect of the present invention, there is provided a stripe-shape color separation filter for use with an image pickup tube comprising a transparent substrate serving as a window of said image pickup tube, filter elements provided on predetermined positions of said substrate and having substantially non-transparency relative to selected color lights, and a layer of transparent material provided on and between said filter elements, said layer having a surface thereof which is flat enough to be practical for use with said image pickup tube.

According to another aspect of the present invention, there is provided a method for manufacturing a stripe-shaped color separation filter for use with an image pickup tube, comprising the steps of preparing a transparent substrate, providing filter elements on predetermined positions of said substrate, said filter elements having non-transparency relative to selected color lights, and forming a layer of transparent material on and between said filter elements.

The above and other objects and features of the present invention will become apparent when reading the following detailed descriptions in conjunction with the accompanying drawings in which:

DETAILED DESCRIPTION

First, for easy understanding of the present invention a description will be made of the principle of an image pickup tube for a single or dual tube type color television camera (hereinafter referred to as a color encoded image pickup tube).

Figure 1:
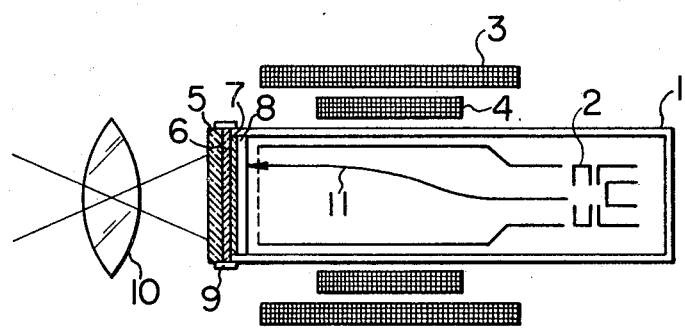
FIG. 1 is a schematic view showing the principle of an image pickup color tube.
Figure 2:
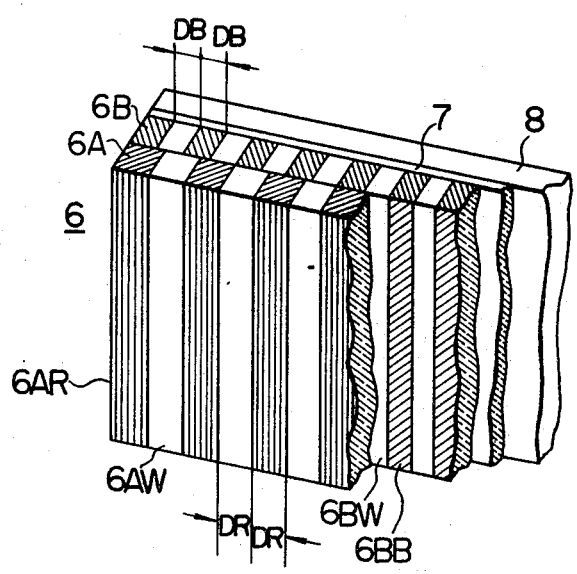
FIG. 2 is a fragmentary enlarged perspective view showing one form of a stripe-shaped color separation filter for the image pickup color tube.

FIG. 1 shows a color encoded image pickup tube 1 of a vidicon type. In the figure, reference numeral 2 is an electron gun, numeral 3 a focusing coil, numeral 4 a deflection yoke, numeral 5 a transparent glass window, numeral 6 a stripe-shaped color separation filter, numeral 7 a transparent conductive film, numeral 8 a photoconductive film, numeral 9 an output terminal in electrical connection with the transparent conductive film 7, numeral 10 an optical system, and numeral 11 an electron beam. The stripe-shaped color separation filter 6 comprises in principle two filter components 6A and 6B as shown in FIG. 2. The filter component 6A includes narrow stripe-shaped filter elements 6AW substantially permitting all color lights from an object to pass therethrough and narrow stripe-shaped filter elements 6AR substantially preventing red color light of the color lights from the object from passing therethrough, the filter elements 6AW and 6AR being arranged in alternate relation to each other. Each of the two filter elements 6AW and 6AR have an equal width of DR. The other filter component 6B, on the other hand, includes narrow stripe-shaped filter elements 6BW substantially permitting all the color lights from the object to pass therethrough and narrow stripe-shaped filter elements 6BB substantially preventing blue color light of the color lights from the object from passing therethrough, the filter elements 6BW and 6BB being arranged in alternate relation to each other. Each of the two filter elements 6BW and 6BB have an equal width of DB. The width DR of each element in the filter component 6A should be different from the width DB of that in the filter component 6B, the width DB being usually narrower than the width DR in the shown embodiment.

With the above-mentioned arrangement, an object image incoming on the photoconductive film 8 through the transparent glass window 5 is sampled in a spatial frequency region by the stripe-shaped color separation filter 6. The scanning of charge pattern caused by the sampled image on the photoconductive film 8 by the electron beam 11 causes multiplex color signals to be produced at the output terminal 9, the signals having two carrier frequencies depending upon the width DR or DB of the filter elements 6AR and 6BB which respectively prevent the red and blue lights from passing through the filter elements 6AR and 6BB of the filter components 6A and 6B. The signals are separated by one low pass filter and two band pass filters to generate three primary color signals, i.e. green, red and blue color signals.

Figure 3:
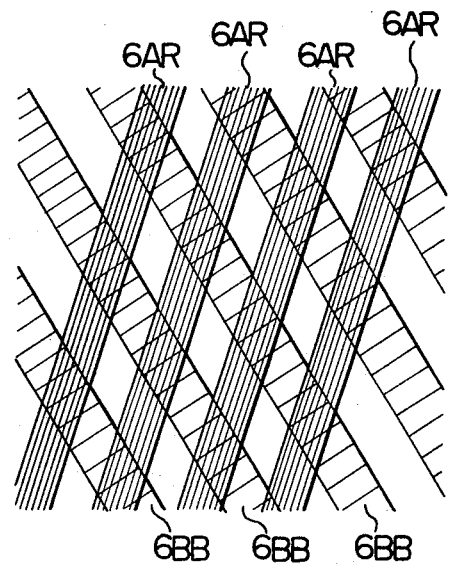
FIGS. 3, 4, 5a and 5b show the stripe-shaped color separation filter in fragmentary enlarged plan view, in perspective view and in cross-sectional views, respectively.

Although in FIG. 2 the narrow stripe-shaped filter elements 6AR, 6AW and 6BB, 6BW in the filter components 6A and 6B have been shown and described as being parallel to each other, they are usually arranged in crossed relation at some angle as shown in FIG. 3 to reduce beats resulting from these two narrow stripe-shaped filter components.

Figure 4:
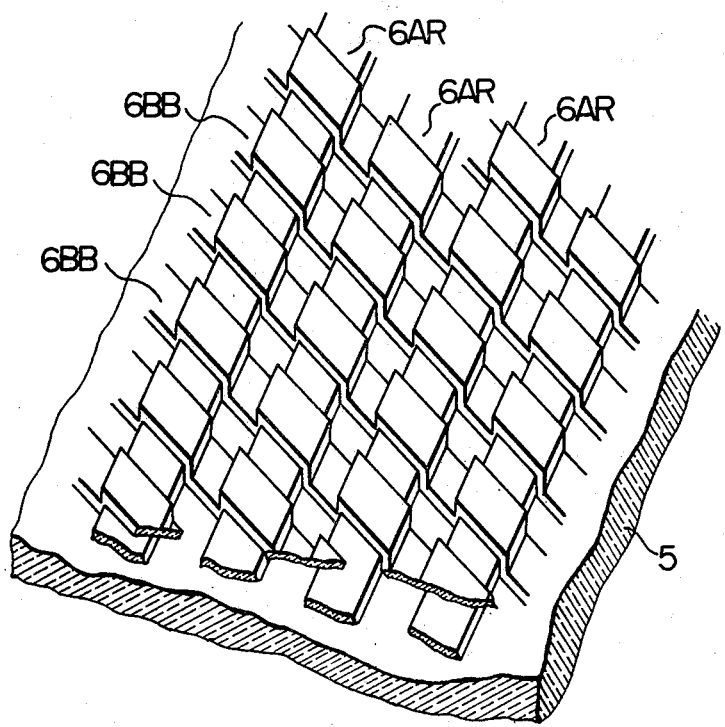
Figure 5A:
Figure 5B:
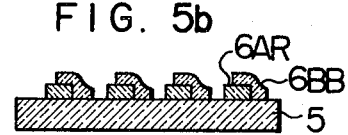

Further, in practice, the construction of the stripe color separation filter 6 is such as shown in FIGS. 4 and 5. On the transparent glass window 5 there are, for example, formed only the narrow stripe-shaped filter elements 6AR constituting the filter component 6A and substantially preventing the red color light from passing therethrough, and then directly on the narrow stripe-shaped filter elements 6AR there are formed the narrow stripe-shaped filter elements 6BB constituting the other filter component 6B and substantially preventing the blue color light from passing therethrough. Thus, in both the filter components 6A and 6B there are provided no narrow stripe-shaped filter elements 6AW and 6BW permitting all the color lights to pass therethrough.

As will be apparent from FIGS. 4 and 5, a number of indentations develop on the surface of the stripe-shaped color separation filter 6, on which the transparent conductive film 7 and the photoconductive film 8 are directly formed. In this case, the films 7 and 8 have their surfaces indented in accordance with the indentations on the surface of the filter 6 with the result that dark current varies partially, particularly at the edge portions of the stripe-shaped filter elements with the same interval as those of the narrow stripe-shaped filter elements. The variation of the dark current is superimposed on the signals resulting from the color light from the object to produce spurious signals and hence spurious color signals with various hindrances to the operation of the image pickup tube.

In order to remove the above-mentioned drawbacks, the stripe-shaped color separation filter according to the present invention is covered with a transparent layer such as glass or $SiO_2$ the surface of which is made flat enough to be applicable to the image pickup tube so that the transparent conductive film and the photoconductive film provided thereon may have the characteristics free from the hindrances resulting from the indentation of the stripe-shaped color separation filter.

Figure 6A:
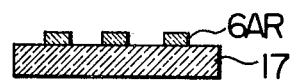
FIGS. 6a to 6f and 7a to 7d are fragmentary enlarged cross-sectional views respectively showing the manufacturing step sequence of embodiments of a stripe-shaped color separation filter according to the present invention.

The present invention will be described by way of embodiments in connection with FIGS. 6a to 6f. As shown in FIG. 6a, on the surface of a substrate 17 serving as a transparent glass window there are first formed narrow stripe-shaped filter elements 6AR substantially preventing the red color light from passing therethrough. Next, a layer of transparent material such as glass or $SiO_2$ substantially permitting all the color lights from the object to pass therethrough is provided on the narrow stripe-shaped filter elements 6AR so as to cover the filter elements 6AR to accomplish a first layer 14 (FIG. 6b). A method for forming the first layer 14 is described later. The surface of the first layer 14 is smoothed as shown in FIG. 6c by polishing or etching to form the first layer 14a having a flat surface. It is, however, needless to say that the above-mentioned smoothing step may be omitted if the surface of the first layer 14 has already been made smooth from a practical point of view.

Figure 6D:
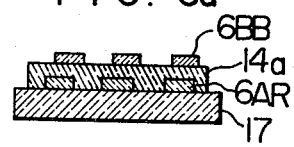
Figure 6B:
Figure 6E:
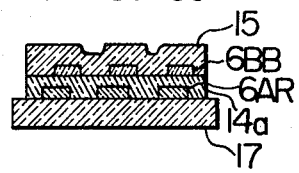
Figure 6C:
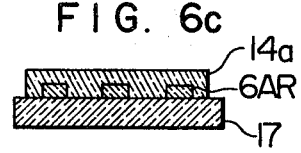
Figure 6F:
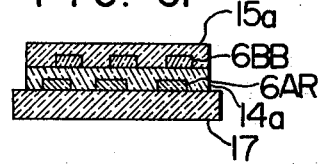

Next, on the surface of the first layer 14a there are formed narrow stripe-shaped filter elements 6BB substantially preventing the blue color light from passing therethrough (FIG. 6d). A second layer 15 of transparent material such as glass or $SiO_2$ is formed on the narrow stripe-shaped filter elements 6BB so as to cover the filter elements in the same way as in the formation of the first layer 14, and is then subjected to the smoothing step as required to form a second layer 15a of substantially flat surface (FIG. 6f).

Thus, the stripe-shaped color separation filter 6 has the substantially flat surface, on which the transparent conductive film 7 and the photoconductive film 8 can be directly disposed flat, thereby preventing the spurious color signals from being produced and preventing the breakdown of the narrow stripe-shaped filter elements 6AR and 6BB. Further, the preparation of the filter can be remarkably facilitated as compared with that of such a filter as shown in FIG. 2 in which the narrow stripe-shaped filter elements 6AR and 6BB preventing the red or blue color light from passing therethrough are disposed in alternate arrangement with the narrow stripe-shaped filter elements 6AW and 6BW permitting all the color lights to pass therethrough.

Figure 7A:
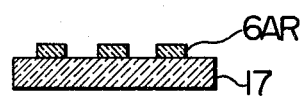
Figure 7B:
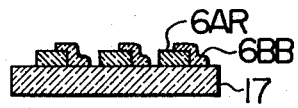
Figure 7C:
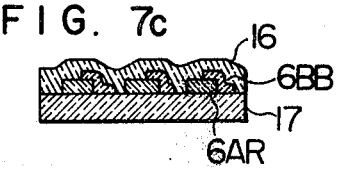
Figure 7D:
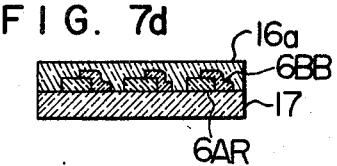

In the above-mentioned embodiment, on the narrow stripe-shaped filter elements 6AR there is formed the first layer 14a, on which are formed another narrow stripe-shaped filter elements 6BB, on which the second layer 15a is further formed. Alternatively, the filter may be prepared in such a way as shown in FIG. 7. Namely, subsequent to the formation of the narrow stripe-shaped filter elements on the substrate 17, another narrow stripe-shaped filter elements 6BB are directly formed thereon as shown in FIG. 7b and then covered with a layer 16 of transparent material such as glass or $SiO_2$ as shown in FIG. 7c with its surface smoothed as required to form a layer 16a of transparent material such as glass or $SiO_2$ having its surface made smooth enough to be practical for use in the image pickup tube.

A method for preparing the layers 14, 15 and 16 will then be described.

In such a condition where the layers 14, 15 and 16 are made of glass which has a melting point lower than the substrate 17, a glass layer is formed by applying melted glass directly to the substrate 17 and the narrow stripe-shaped filter element 6AR and 6BB. Alternatively, the glass layer is formed by preparing a suspension solution of powdered glass for deposition on the substrate by the use of a centrifugal separator or spinner and heating it at a temperature of several hundred degrees Centigrade with removal of a supernatant liquid in order to melt the powdered glass for formation of the glass layer. For the suspension solution there may be used an organic solvent such as alcohol, ketone, or acetate. This method permits the surface of the glass layer to be made relatively smooth and the thin glass layer to be prepared without giving damages to the narrow stripe-shaped filter elements 6AR and 6BB even if the glass employed in the glass layer has the melting point the same as or relatively higher than the substrate, including the melting point lower than it as a matter of course.

Further alternatively, the powdered glass are mixed into a solvent such as amyl acetate together with a caking agent such as methylcellulose or nitrocellulose, and are then applied to the substrate by dipping, brushing, spraying or screen-pressing. Thereafter, the caking agent and the solvent are removed at a relatively low temperature, the resultant glass powders being sintered at a higher sintering temperature to form the glass layer. This method brings about effects similar to those of the previous method, advantageously permitting the glass layer to have a further smoother surface with simplified operations.

The layers 14, 15 and 16 may be prepared by deposition. For example, transparent materials of $SiO_2$ or glass may be deposited by a vacuum-deposition method. The materials can be selected from glass materials over a wide range to obtain an excellent transparent film except for those including in an excessive amount lead oxide which is decomposited due to heating at high temperatures in the vacuum. The application range, of course, extends over some kind of chalcogen glass.

According to another method, an $SiO_2$-deposited layer serving as the layers 14, 15 and 16 can be prepared by chemical vapor deposition, i.e. by spraying a compound vapor on the heated substrate and effecting a decomposition oxidation reaction thereon for oxide coating on the substrate.

Taking an example of direct oxidation of monosilane ($SiH_4$),

$$SiH_4 + 2 O_2 \rightarrow SiO_2 + 2H_2O$$

The above reaction leads to the formation of the $SiO_2$ layer.

Also, a layer of inorganic glassy material serving as the layers 14, 15 and 16 may be prepared by chemical vapor deposition.

Further, the $SiO_2$ layer serving as the layers 14, 15 and 16 may be formed by sputtering, in which $SiO_2$ is constructed as a target cathode and sputtered to form the $SiO_2$ coating under the pressure as low as 1 to 10 × $10^{-2}$ Torr in a gaseous atmosphere including argon and oxygen at a discharging voltage of 1 to 1.5 KV. Alternatively, a silica glass plate ($SiO_2$) or glass plate serving as a material therefor is constructed as the target cathode and formed to the $SiO_2$ coating or a desired glass coating through the discharging in the atmosphere of argon gas under the pressure as low as $5 \times 10^{-3}$ Torr.

Also, a glass layer serving as the layers 14, 15 and 16 may be formed by sputtering.

What is claimed is:

1. A stripe-shaped color separation filter for use with an image pickup tube comprising a transparent substrate serving as a window of said image pickup tube, a first group of spaced filter elements provided at predetermined positions on said substrate for preventing light of a first color from passing therethrough, and a second group of spaced filter elements provided at predetermined positions on said first group of filter elements in partially superimposed relationship for preventing light of a second color from passing therethrough, and a layer of a transparent material transparent to substantially all light provided on and between said filter elements, said layer having a surface thereof which is flat enough to be practical for use with said image pickup tube.

2. A stripe-shaped color separation filter as set forth in claim 1, further comprising another layer of a transparent material between said first and second groups of elements, said another layer having a surface thereof which is flat on the side of said second group of elements.

3. A color separation filter for use with an image pickup tube comprising (a) a transparent substrate serving as a window of said image pickup tube, (b) a plurality of filter elements provided at predetermined positions on said substrate, said filter elements exhibiting substantial non-transparency with respect to light of at least one color, said filter elements being spaced from one another so as to define openings therebetween, and (c) a layer of a transparent material transparent to substantially all light on said filter elements, said transparent material filling said openings, said layer having a substantially flat surface.

4. The color separation filter of claim 3, wherein said filter elements are shaped in the form of parallel stripes.

5. The color separation filter of claim 4 and comprising a first group of filter elements exhibiting substantial non-transparency with respect to light of a first color and a second group of filter elements exhibiting substantial non-transparency with respect to light of a second color.

6. The color separation filter of claim 5 further comprising another layer of a transparent material intermediate said first group of filter elements and said second group of filter elements.

7. The color separation filter of claim 6, wherein said first group of filter elements and said second group of filter elements are askew.

8. The color separation filter of claim 5, wherein said first group of filter elements and said second group of filter elements are askew.

9. A stripe-shaped color separation filter as set forth in claim 1, wherein the surface of said layer is flat.

10. A method for manufacturing a stripe-shaped color separation filter for use with an image pickup tube, comprising providing spaced filter elements at predetermined positions on a transparent substrate, said filter elements having non-transparency relative to selected color lights, and forming a layer of transparent material transparent to substantially all light on and between said filter elements, said layer having a surface flat enough to be practical for use with said image pickup tube, said layer of transparent material being formed by applying said transparent material to said filter elements and said substrate and thereafter smoothing the surface of the layer so formed.

11. A method as set forth in claim 10, wherein said smoothing step is effected by polishing.

12. A method as set forth in claim 10, wherein said smoothing step is effected by etching.

13. A method as set forth in claim 10, wherein said layer is formed by vacuum deposition.

14. A method as set forth in claim 10, wherein said layer is made of inorganic glassy material and formed by chemical vapor deposition.

15. A method as set forth in claim 10, wherein said layer is made of $SiO_2$ and formed by chemical vapor deposition.

16. A method as set forth in claim 10, wherein said layer is made of glass and formed by sputtering.

17. A method as set forth in claim 10, wherein said layer is made of $SiO_2$ and formed by sputtering.

18. A method as set forth in claim 10, wherein the surface of said layer is flat.

19. A method for manufacturing a stripe-shaped color separation filter for use with an image pickup tube, comprising providing at predetermined positions on said substrate a first group of spaced filter elements having substantial non-transparency relative to light of a first color, providing a second group of spaced filter elements having substantial nontransparency relative to light of a second color at predetermined positions on said first group of elements in partially superimposed relationship, and forming a layer of transparent material transparent to substantially all light on and between said filter elements, said layer having a surface flat enough to be practical for use with said image pickup tube.

20. A method as set forth in claim 19, wherein another layer of transparent material is provided on said first group of elements prior to the formation of said second group of elements, and further said second group of elements are then formed on said another layer.

21. A method as set forth in claim 20, further comprising smoothing the surface of said another layer substantially flatly.

22. A method for making a color separation filter comprising providing a plurality of filter elements at predetermined positions on a transparent substrate, said filter elements having non-transparency relative to light of at least one color, said filter elements defining therebetween openings, and forming a layer of transparent material transparent to substantially all light on said plurality of filter elements, said transparent material filling said openings and defining a substantially flat surface.

23. The method of claim 22, wherein said filter elements are substantially parallel stripes.

24. The method of claim 23 comprising providing a first group of filter elements on said transparent substrate and thereafter providing a second group of filter elements on said first group of filter elements.

25. The method of claim 24 further comprising providing another layer of a transparent material intermediate said first group of filter elements and second group of filter elements.

26. The method of claim 25, wherein said second group of filter elements and said first group of filter elements are askew.

27. The method of claim 24, wherein said second group of filter elements and said first group of filter elements are askew.

28. A method for manufacturing a stripe-shaped color separation filter for use with an image pickup tube, comprising providing spaced filter elements at predetermined positions on a transparent substrate, said filter elements having nontransparency relative to selected color lights, and forming a layer of transparent material transparent to substantially all light on and between said filter elements by melting powdered glass, said layer having a surface flat enough to be practical for use with said image pickup tube.

29. A method for manufacturing a stripe-shaped color separation filter for use with an image pickup tube, comprising providing spaced filter elements at predetermined positions on a transparent substrate, said filter elements having nontransparency relative to selected color lights, and forming a layer of transparent material transparent to substantially all light on and between said filter elements by applying melted glass, said layer having a surface flat enough to be practical for use with said image pickup tube.

30. A method for manufacturing a stripe-shaped color separation filter for use with an image pickup tube, comprising providing spaced filter elements at predetermined positions on a transparent substrate, said filter elements having non-transparency relative to selected color lights, and forming a layer of transparent material transparent to substantially all light on and between said filter elements, said layer having a surface flat enough to be practical for use with said image pickup tube, said layer being formed by suspending powdered glass in an organic solvent, depositing said powdered glass in the form of a suspension onto said filter elements, removing therefrom the supernatant liquid of suspension and thereafter heating said powdered glass at a temperature of several hundred degrees Centigrade.

31. A method for manufacturing a stripe-shaped color separation filter for use with an image pickup tube, comprising providing spaced filter elements at predetermined positions on a transparent substrate, said filter elements having non-transparency relative to selected color lights, and forming a layer of transparent material transparent to substantially all light on and between said filter elements, said layer having a surface flat enough to be practical for use with said image pickup tube, said layer being formed by applying on said filter elements a mixture of amyl acetate solvent with powdered glass and a caking agent, removing therefrom said solvent and caking agent at a relatively low temperature, and thereafter heating and melting said powdered glass at a temperature of several hundred degrees Centigrade.

* * * * *